United States Patent
Cobb

(10) Patent No.: US 11,331,747 B1
(45) Date of Patent: May 17, 2022

(54) SELF-REACTING FRICTION STIR WELDING TOOL

(71) Applicant: United States of America as represented by the Administrator of NASA, Washington, DC (US)

(72) Inventor: Josef Benjamin Cobb, Huntsville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 61 days.

(21) Appl. No.: 16/908,219

(22) Filed: Jun. 22, 2020

Related U.S. Application Data

(60) Provisional application No. 62/938,015, filed on Nov. 20, 2019.

(51) Int. Cl.
*B23K 20/12* (2006.01)

(52) U.S. Cl.
CPC .................. *B23K 20/1255* (2013.01)

(58) Field of Classification Search
CPC .............. B23K 20/1255; B23K 20/125; B23K 20/126; B23K 20/1265; B23K 20/128; B23K 20/1215; B23K 20/122; B23K 20/124; B23K 20/227; B23K 2103/04; B23K 20/1225; B23K 20/123; B23K 20/1235; B23K 20/1245; B23K 20/1275; B23K 20/2275; B23K 20/2336; B23K 2101/006; B23K 2101/18; B23K 2103/08; B23K 2103/10; B23K 2103/14; B23K 2103/18; B23K 2103/20; B23K 2103/26; B23K 26/0661

See application file for complete search history.

(56) References Cited

U.S. PATENT DOCUMENTS

| | | | |
|---|---|---|---|
| 7,401,723 B2 | 7/2008 | Stol et al. | |
| 7,464,852 B2 | 12/2008 | Waldron et al. | |
| 8,893,951 B2 | 11/2014 | dos Santos et al. | |
| 9,457,513 B2 | 10/2016 | Hutsch et al. | |
| 9,468,990 B2 | 10/2016 | Osikowicz | |
| 9,975,201 B2 | 5/2018 | Anzai et al. | |
| 9,976,133 B2 | 5/2018 | Heller et al. | |
| 10,279,422 B2 | 5/2019 | Werz et al. | |
| 2006/0124691 A1* | 6/2006 | Wood | B23K 20/1265 228/2.1 |
| 2006/0163316 A1* | 7/2006 | Burton | B23K 20/125 228/2.1 |
| 2006/0169741 A1* | 8/2006 | Smith | B23K 20/1265 228/2.1 |
| 2007/0152015 A1* | 7/2007 | Burton | B23K 20/126 228/2.1 |

(Continued)

*Primary Examiner* — Erin B Saad
(74) *Attorney, Agent, or Firm* — Jerry L. Seemann; Helen M. Galus

(57) ABSTRACT

A self-reacting friction stir welding (SR-FSW) tool includes a crown shoulder having a central bore and a pin that extends through the crown shoulder's central bore. The central bore includes a first region at a first axial end of the crown shoulder, a second region axially adjacent to the first region, and a third region axially adjacent to the second region. The first region and third region have a diameter that provides sliding contact with the pin. The pin and crown shoulder have an annular gap there between at the second region of the central bore.

6 Claims, 3 Drawing Sheets

(56) References Cited

U.S. PATENT DOCUMENTS

| | | | |
|---|---|---|---|
| 2009/0123778 A1* | 5/2009 | Russell | B23K 20/1275 |
| | | | 428/661 |
| 2013/0255884 A1* | 10/2013 | Baumann | B23Q 3/002 |
| | | | 156/538 |
| 2015/0143686 A1* | 5/2015 | Blacket | B21J 15/26 |
| | | | 29/525.06 |
| 2016/0008918 A1* | 1/2016 | Burford | B23K 20/1255 |
| | | | 228/112.1 |
| 2016/0354860 A1* | 12/2016 | Boettcher | B23K 20/2336 |
| 2018/0056436 A1* | 3/2018 | Thomas | B23K 20/128 |
| 2018/0056439 A1* | 3/2018 | Thomas | B23K 20/124 |

* cited by examiner

SELF-REACTING FRICTION STIR WELDING TOOL

CROSS-REFERENCE TO RELATED PATENT APPLICATIONS

This application claims the benefit of U.S. Application Ser. No. 62/938,015 filed Nov. 20, 2019, hereby incorporated by reference.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to friction stir welding tools. More specifically, the invention is a self-reacting friction stir welding tool that reduces internal friction forces within the tool during a welding operation.

2. Description of the Related Art

In self-reacting friction stir welding (SR-FSW), a weld tool includes weld pin passing through a crown shoulder and into rigid engagement with a root shoulder that is spaced apart from the crown shoulder. Workpieces to be welded reside between the crown and root shoulders. During welding, a pinch force is applied to the workpieces between the crown and root shoulders by applying a load to the weld pin to thereby draw the root shoulder towards the workpieces. Some of the weld material can wick up into the tight interface between the weld pin and the crown shoulder. As weld length increases, the wicked material imparts a drag force between the weld pin and crown shoulder. When this occurs, the load applied to the upper end of the pin can be shunted thereby causing pinch loads between the crown and root shoulders to be different than the prescribed load applied by the FSW machine to the weld pin passing through the crown shoulder. The load differential results in inconsistent weld parameters and an increase in weld defects. In addition, the build-up of the wicked weld material that leads to increased or decreased loads from nominal can, in turn, lead to tool damage and/or premature tool failure.

SUMMARY OF THE INVENTION

Accordingly, it is an object of the present invention to provide a self-reacting friction stir welding tool.

Another object of the present invention is to provide a self-reacting friction stir welding tool capable of providing consistent weld parameters over long-length welds.

Other objects and advantages of the present invention will become more obvious hereinafter in the specification and drawings.

In accordance with the present invention, a self-reacting friction stir welding (SR-FSW) tool includes a crown shoulder having a central bore and a pin extending through the crown shoulder's central bore. The central bore includes a first region at a first axial end of the crown shoulder adapted to engage a surface of a workpiece, a second region axially adjacent to the first region, and a third region axially adjacent to the second region. The first region and third region have a diameter that provides sliding contact with the pin. The pin and crown shoulder have an annular gap there between at the second region of the central bore.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

Figure 4:
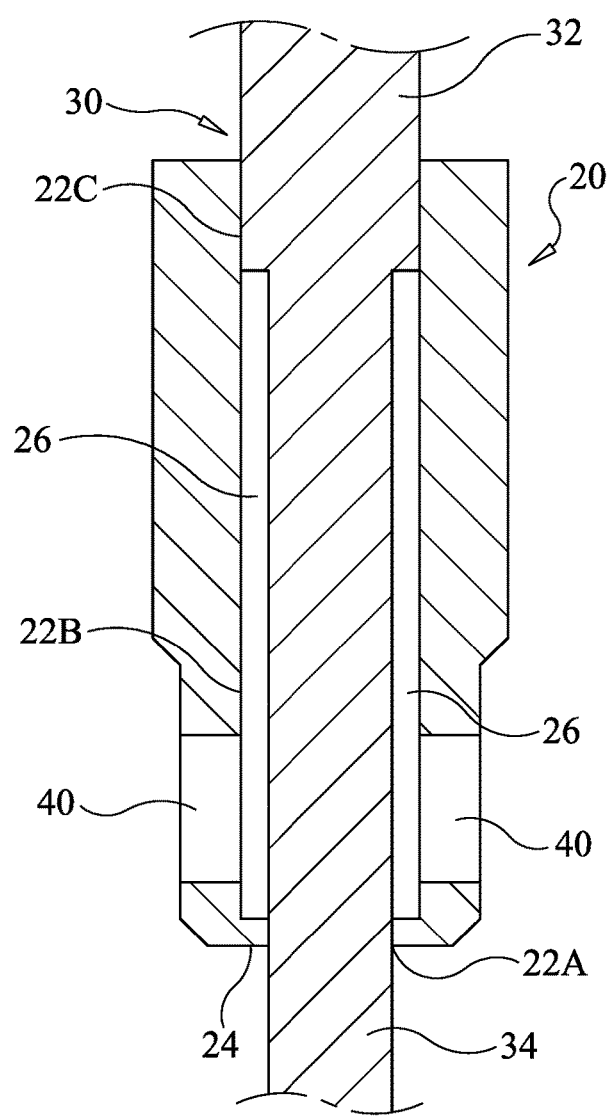
Figure 5:
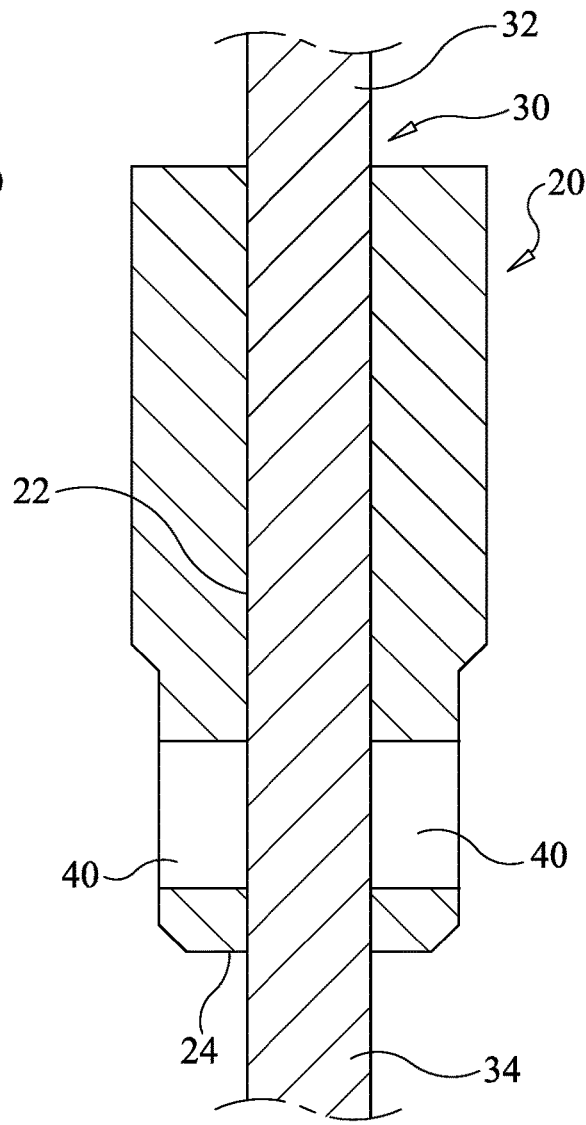

FIG. 4 is a cross-sectional view of a portion of self-reacting friction stir welding tool illustrating the tool's crown shoulder and weld pin in accordance with still another embodiment of the present invention; and FIG. 5 is a cross-sectional view of a portion of self-reacting friction stir welding tool illustrating the tool's crown shoulder and weld pin in accordance with another embodiment of the present invention.

DESCRIPTION OF THE PREFERRED EMBODIMENT(S)

Figure 1:
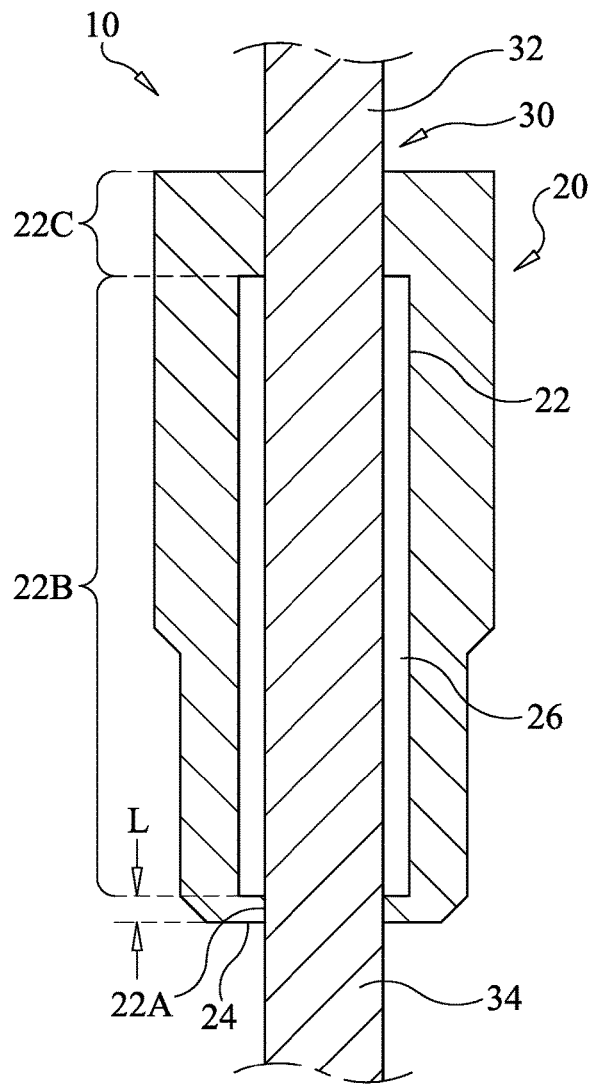
FIG. 1 is a cross-sectional view of a portion of a self-reacting friction stir welding tool illustrating the tool's crown shoulder and weld pin in accordance with an embodiment of the present invention.

Referring now to the drawings and more particularly to FIG. 1, a portion of a self-reacting friction stir welding (SR-FSW) tool is illustrated and is referenced generally by numeral 10. Tool portion 10 includes the tool's crown shoulder 20 and a portion of the tool's weld pin 30. As is well-known in the SR-SFW art, pin 30 extends through crown shoulder 20 with one axial end 32 of pin 30 being coupled to a load source (not shown) and the other axial end 34 of pin 30 being rigidly coupled to a root shoulder (not shown) that is spaced apart from crown shoulder 20. It is to be understood that the configurations of pin 30 where it is coupled to a load source and root shoulder are not limitations of the present invention.

Crown shoulder 20 has an axially-extending central bore 22 through which pin 30 passes. One axial end 24 of crown shoulder 20 will bear against a surface of a workpiece (not shown) during a welding operation as would be well understood in the art. Beginning at axial end 24, central bore 22 includes the sequentially adjacent first bore region 22A, second bore region 22B, and third bore region 22C. In the illustrated embodiment, first bore region 22A and third bore region 22C have a diameter that provides sliding contact with pin 30 to facilitate axial movement and alignment of pin 30 within central bore 22 during a weld operation. Bore regions 22A and 22C support the radial loads (i.e., bending moments and shear loads) by pin 30 and the tool's root shoulder during a welding operation. The diameter of second bore region 22B is greater the diameter of first and third bore regions 22A and 22C, respectively, to thereby create an annular gap 26 about pin 30 at second bore region 22B.

During a weld operation, some weld material (not shown) will wick up into central bore 22 around pin 30 at first bore region 22A. As described previously herein, the wicked weld material causes friction between first bore region 22A around pin 30. However, the present invention minimizes frictional drag between pin 30 and central bore 22 caused by wicked weld material while still supporting strict axial movement of pin 30 by providing an axial length "L" of first bore region 22A as small as reasonably possible that also provides support for the loads applied by the pin for the full duration of a weld. For many weld applications, these criteria are satisfied by axial length L that is generally in the range of 0.01 inches to 1.5 inches.

As a weld operation progresses, wicked weld material is pushed up from first bore region 22A into annular gap 26 where it can loosely collect and not cause friction forces to continue to increase between central bore 22 and pin 30. To provide a sufficient volume for weld material collection, the axial length and radial width of annular gap 26 can be customized to meet the needs of a particular application.

Figure 2:
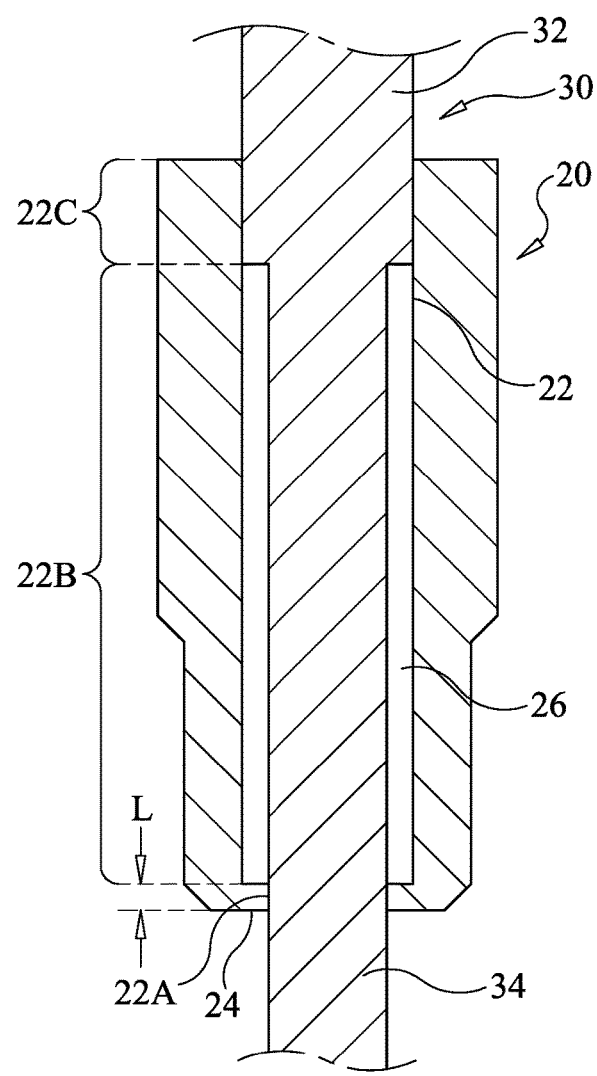
FIG. 2 is a cross-sectional view of a portion of self-reacting friction stir welding tool illustrating the tool's crown shoulder and weld pin in accordance with another embodiment of the present invention.

It is to be understood that the present invention is not limited to the embodiment illustrated in FIG. 1. For example, in FIG. 2, third bore region 22C has a diameter equal to that of second bore region 22B. However, the diameter of pin 30 that will engage with third bore region 22C is increased such that pin 30 and third bore region 22C are still in sliding contact with one another.

Figure 3:
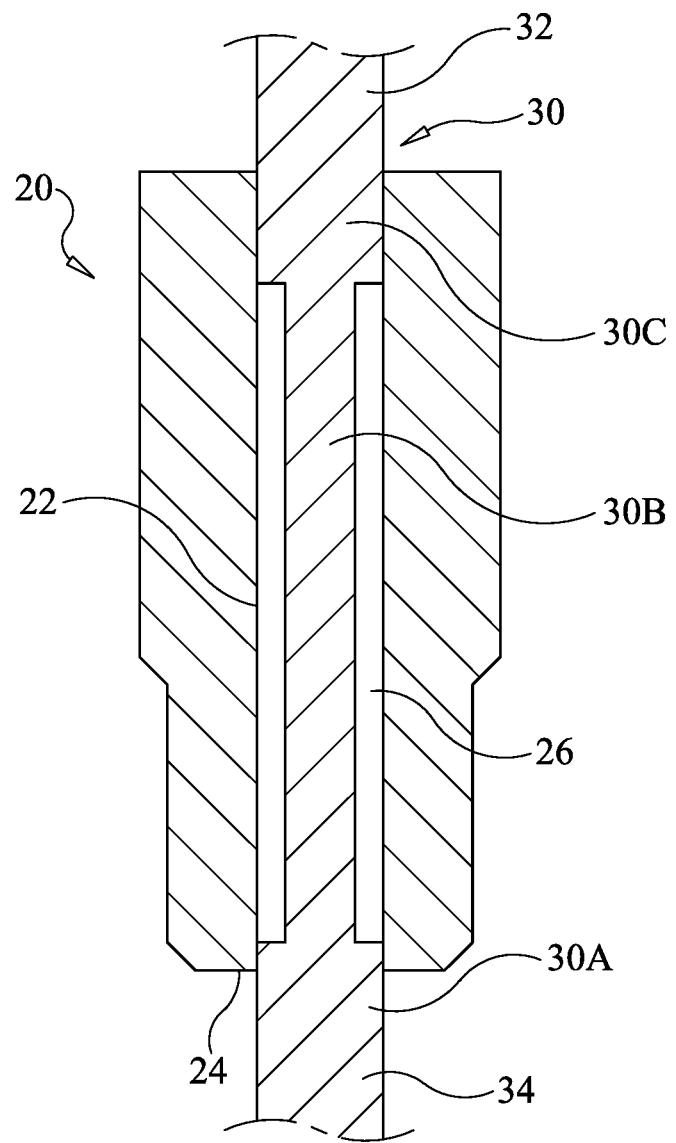
FIG. 3 is a cross-sectional view of a portion of self-reacting friction stir welding tool illustrating the tool's crown shoulder and weld pin in accordance with yet another embodiment of the present invention.

In another embodiment of the present invention illustrated in FIG. 3, the above-described annular gap between a weld tool's pin and crown shoulder's central bore can be created by the configuration of the pin. More specifically, the portion of pin 30 residing within crown shoulder 20 during a weld operation includes a first pin region 30A, a second pin region 30B, and a third pin region 30C. In this embodiment, central bore 22 has a diameter that provides sliding contact with first pin region 30A and third pin region 30C, while second pin region 30B has a diameter that is less than that of first and third pin regions 30A and 30B, respectively. As a result, annular gap 26 is created solely by the configuration of pin 30. The axial length of first pin region 30B can be in the same range as above-described first bore region 22A. It is to be understood that the creation of the above-described annular gap could also be created by the combination of the diameter configuration of central bore 22 and pin 30 without departing from the scope of the present invention.

Each of the above-described embodiments collects wicked weld material in the annular gap between the tool's crown shoulder and weld pin. For longer-length weld applications, it may be desirable to remove the wicked material during a weld operation. Accordingly, the embodiment of the present invention illustrated in FIG. 4 modifies the tool illustrated in FIG. 1 by further including one or more radial bore holes 40 in crown shoulder 20. More specifically, each such radial bore hole 40 passes through a sidewall of crown shoulder 20 to provide a fluid communication path between annular gap 26 and the exterior of crown shoulder 20. As a result, wicked weld material collecting in annular gap 26 will eventually be pushed out of annular gap 26 via radial bore hole(s) 40. It is to be understood that one or more radial bore holes could also be employed with embodiments illustrated in FIG. 2 or 3 without departing from the scope of the present invention.

The advantages of the present invention are numerous. The annular gap in the weld tool limits the drag-force effects caused by wicked weld material in a SR-FSW operation. As a result, well consistency and tool life will be improved as weld defects are reduced.

Although the invention has been described relative to a specific embodiment thereof, there are numerous variations and modifications that will be readily apparent to those skilled in the art in light of the above teachings. For example, in some applications, it may be sufficient to just provide a radial bore holes for wicked weld material removal without providing an annular gap for wicked weld material collection. This is illustrated in FIG. 5 where all of central bore 22 and pin 30 are configured for sliding contact there between, and one or more radial bore holes 40 provide a fluid communication path between central bore 22 and the exterior of crown shoulder 20. The one or more radial bore holes 40 in this embodiment will generally begin as close to the crown shoulder's axial end 24 as possible without compromising the structural integrity of crown shoulder 20. It is therefore to be understood that, within the scope of the appended claims, the invention may be practiced other than as specifically described.

What is claimed as new and desired to be secured by Letters Patent of the United States is:

1. A crown shoulder portion of a self-reacting friction stir welding (SR-FSW) tool, comprising:
 a crown shoulder having a central bore,
 said central bore including a first region at a first axial end of said crown shoulder adapted to engage a surface of a workpiece, a second region axially adjacent to said first region, and a third region axially adjacent to said second region;
 a pin extending through said central bore of said crown shoulder and adapted to pass through the workpiece;
 said first region and said third region having a diameter for sliding contact with said pin;
 said pin and said crown shoulder having an annular gap there between at said second region of said central bore wherein said pin and said crown shoulder are not in contact with one another along said second region, said annular gap adapted to collect weld material wicked from the workpiece and into said central bore about said pin at said first region of said central bore; and
 at least one open bore hole passing through said crown shoulder and in fluid communication with said annular gap wherein the weld material wicked into said annular gap is free to flow through said at least one open bore hole.

2. A crown shoulder portion of a SR-FSW tool as in claim 1, wherein an axial length of said first region is in a range of 0.01 inches to 1.5 inches.

3. A crown shoulder portion of a SR-FSW tool as in claim 1, wherein said annular gap is created by a diameter of said second region of said central bore.

4. A crown shoulder portion of a SR-FSW tool as in claim 1, wherein said annular gap is created by a diameter of a portion of said pin aligned with said second region of said central bore.

5. A crown shoulder portion of a SR-FSW tool as in claim 1, wherein said annular gap is created by a combination of a diameter of said second region of said central bore and a diameter of a portion of said pin aligned with said second region of said central bore.

6. A crown shoulder portion of a self-reacting friction stir welding (SR-FSW) tool, comprising:
 a crown shoulder having a central bore and at least one open bore hole passing radially through said crown shoulder and in fluid communication with said central bore, said crown shoulder having an axial end thereof adapted to engage the surface of a workpiece;

a pin extending through said central bore of said crown shoulder and adapted to pass through the workpiece; and said central bore having a diameter that provides sliding contact with said pin, wherein weld material wicked from the workpiece and into said central bore about said pin is free to flow through said at least one open bore hole.

* * * * *